(12) United States Patent
El Assaad et al.

(10) Patent No.: US 11,343,059 B2
(45) Date of Patent: May 24, 2022

(54) APPARATUS, METHOD AND COMPUTER PROGRAM FOR DETERMINING A DUPLEX RESOURCE SCHEME FOR A LOCALIZED COMMUNICATION IN A MOBILE COMMUNICATION SYSTEM

(71) Applicant: Volkswagen Aktiengesellschaft, Wolfsburg (DE)

(72) Inventors: Ahmad El Assaad, Wolfsburg (DE); Ernst Zielinski, Bochum (DE); Joakim Cerwall, Stockholm (SE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 92 days.

(21) Appl. No.: 16/810,967

(22) Filed: Mar. 6, 2020

(65) Prior Publication Data
US 2020/0287700 A1 Sep. 10, 2020

(30) Foreign Application Priority Data
Mar. 8, 2019 (EP) ..................................... 19161678

(51) Int. Cl.
*H04L 5/14* (2006.01)
*H04W 4/46* (2018.01)
*H04W 4/44* (2018.01)
*H04W 72/04* (2009.01)

(52) U.S. Cl.
CPC ................. *H04L 5/14* (2013.01); *H04W 4/44* (2018.02); *H04W 4/46* (2018.02); *H04W 72/042* (2013.01)

(58) Field of Classification Search
None
See application file for complete search history.

(56) References Cited

U.S. PATENT DOCUMENTS

| | | | | |
|---|---|---|---|---|
| 2014/0233472 A1* | 8/2014 | Kadel | ................... | H04W 28/26 370/329 |
| 2017/0193410 A1 | 7/2017 | Jones-Mc-Fadden et al. | | |
| 2019/0045397 A1* | 2/2019 | Mueck | ................... | H04W 88/06 |

FOREIGN PATENT DOCUMENTS

| | | |
|---|---|---|
| EP | 2150081 A2 | 2/2010 |
| EP | 2175585 A1 | 4/2010 |
| EP | 3174341 A1 | 5/2017 |

(Continued)

*Primary Examiner* — James P Duffy
(74) *Attorney, Agent, or Firm* — 2SPL Patent Attorneys PartG mbB; Yong Beom Hwang (57) ABSTRACT

The present invention relates to an apparatus, a method and a computer program for determining a duplex resource scheme for a localized communication in a mobile communication system, and to a method for a vehicle, which uses the determined resource scheme for the localized communication in the mobile communication system. The method for determining a duplex resource scheme for a localized communication in a mobile communication system comprises obtaining environmental perception data. The environmental perception data relates to a plurality of road users. The method further comprises predicting a plurality of radio resources required for a communication of the plurality of road users based on the obtained environmental perception data. The method further comprises determining the duplex resource scheme based on the predicted plurality of radio resources required for the communication of the plurality of road users.

15 Claims, 3 Drawing Sheets

(56) References Cited

FOREIGN PATENT DOCUMENTS

WO    2018195503  A1    10/2018
WO    2018204264  A1    11/2018

* cited by examiner

APPARATUS, METHOD AND COMPUTER PROGRAM FOR DETERMINING A DUPLEX RESOURCE SCHEME FOR A LOCALIZED COMMUNICATION IN A MOBILE COMMUNICATION SYSTEM

The present invention relates to an apparatus, a method and a computer program for determining a duplex resource scheme for a localized communication in a mobile communication system, and to a method for a vehicle, which uses the determined resource scheme for the localized communication in the mobile communication system.

Vehicular communication is a field of research and development. To enable an autonomous or semi-autonomous driving of the vehicles, vehicles are expected to use Vehicle-to-Vehicle-Communication (V2V) and Vehicle-to-Network (V2N) communication, e.g. to coordinate driving maneuvers and/or to receive tele-operated driving instructions. This communication is generally wireless, i.e. vehicles may wirelessly communicate with other vehicles in their vicinity and/or with backend services via cellular mobile communication systems.

International patent application WO 2018/195503 A1 discloses an apparatus, system and method for utilizing a flexible slot format indicator. The flexible slot format indicator may e.g. be used in conjunction with dynamic Time Division Duplex (dynamic TDD).

International patent application WO 2018/204264 A1 discloses techniques and apparatuses for a priority-based resource configuration.

European patent application EP 3174341 A1 discloses methods and nodes for setting values of system parameters used in a wireless communication system.

As wireless communication occurs over a shared medium, which may be limited by the availability of radio resources, there may be a desire to provide an improved concept for radio resource management in vehicular communication.

Embodiments are based on the finding that environmental perception data that is generated by road users (i.e. vehicles, such as cars, motorbikes or bicycles, or pedestrians) and (optionally) road-infrastructure entities may be used to predict a localized communication of road users in a mobile communication system, e.g. within a cluster of vehicles or between road users and base stations of the mobile communication system. Based on the predicted communication, radio resources may be determined that are required for the predicted communication. Based on the determined radio resources, a duplex resource scheme, such as a dynamic Time Division Duplex (dynamic TDD), may be adapted, so sufficient radio resources are available for the predicted communication.

Embodiments provide a method for determining a duplex resource scheme for a localized communication in a mobile communication system. The method comprises obtaining environmental perception data. The environmental perception data relates to a plurality of road users. The method further comprises predicting a plurality of radio resources required for a communication of the plurality of road users based on the obtained environmental perception data. The method further comprises determining the duplex resource scheme based on the predicted plurality of radio resources required for the communication of the plurality of road users. By processing the environmental perception data, the method may determine traffic situations and/or constellations of road users, which are likely to lead to inter-road user communication (e.g. for inter-road user coordination) or to a communication between a road user and a base station (e.g. for tele-operated driving). Based on this predicted communication, the method may predict the radio resources that are required for the predicted communication, e.g. a share of downlink, uplink and side-link communication. These predicted radio resources may be used to adjust the duplex resource scheme, e.g. to allocate sufficient radio resources for the respective shares of downlink, uplink and side-link communication.

In at least some examples, the duplex resource scheme comprises a dynamic time-division duplex resource scheme. The dynamic TDD resource scheme may be adapted to shift radio resources between uplink, downlink and side-link communication, e.g. to accommodate the predicted communication.

Alternatively or additionally, the duplex resource scheme comprises at least one of a frequency-division duplex (FDD) resource scheme, a code duplex resource scheme, and a spatial resource scheme. By adding more flexibility in the resources that are part of the duplex resource scheme, a higher flexibility in the allocation of the radio resources may be reached.

The duplex resources may be allotted between at least two of uplink communication, downlink communication, and side-link communication within the duplex resource scheme. In vehicular communication, different traffic situations may lead to different traffic patterns. For example, in inter-cluster communication, side-link communication may be used primarily, while uplink and downlink communication may be required for tele-operated driving.

In at least some embodiments, the method comprises obtaining information related to a plurality of planned maneuvers of the plurality of road users. The plurality of radio resources required for the communication of the plurality of road users may be predicted based on the information related to the plurality of planned maneuvers of the plurality of road users. If the planned maneuvers are known in the determination of the radio resources, a higher accuracy in the prediction of the radio resources may be reached.

For example, the environmental perception data may comprise modeling information for an area surrounding the plurality of road users. The modeling information may relate to objects that have been identified by a road user executing the method or by the plurality of road users, using one or more perception sensors of the road user or of the plurality of road users. The environmental perception data may provide a high-level abstraction of the objects perceived by the road user or by the plurality of road users, which may be easier to process in the prediction of the radio resources required for the communication of the plurality of road users.

In some embodiments, the method is executed by a stationary entity of the mobile communication system. This may enable a centralized adaptation of the duplex resource scheme.

In some other embodiments, the method is executed by a road user, e.g. a vehicle. This may enable a localized adaptation of the duplex resource scheme if the plurality of road users are out of coverage of a coverage area of base stations of the mobile communication system.

For example, the method may be executed by the road user if the road user is out of coverage of the mobile communication system. A hybrid approach may be used: If the road user is in coverage, a centralized adaptation of the duplex resource scheme may be used, and if the road user is out of coverage, the road user may perform the localized adaptation of the duplex resource scheme. If the method is executed by the road user, the environmental perception data may be based on one or more perceptions sensors of the road user.

In some embodiments, the environmental perception data may be obtained from the plurality of road users and from one or more road-side infrastructure entities. This may augment the environmental perception data, as environmental perception data of static entities, which may comprise better sensors, better processing capabilities, and/or which may be located advantageously, may be incorporated in the prediction of the required radio resources.

The method may comprise providing the duplex resource scheme to the plurality of road users using a control channel of the mobile communication system. This may enable the plurality of road users to adapt their communication based on the duplex resource scheme.

Accordingly, embodiments further provide a method for a road user, e.g. a vehicle. The method comprises transmitting environmental perception data of the road user to a further road user or to a stationary entity of a mobile communication system. The method further comprises receiving a duplex resource scheme for a localized communication in the mobile communication system from the further road user or from the stationary entity. The duplex resource scheme is based on the transmitted environmental perception data. The method further comprises performing the localized communication (e.g. by communicating in the mobile communication system) based on the duplex resource scheme.

Embodiments further provide a computer program having a program code for performing at least one of the methods, when the computer program is executed on a computer, a processor, or a programmable hardware component.

Embodiments further provide an apparatus for determining a duplex resource scheme for a localized communication in a mobile communication system. The apparatus comprises at least one interface for communicating with a plurality of road users. The apparatus comprises a control module configured to obtain environmental perception data via the at least one interface. The environmental perception data relates to a plurality of road users. The control module is configured to predict a plurality of radio resources required for a communication of the plurality of road users based on the obtained environmental perception data. The control module is configured to determine the duplex resource scheme based on the predicted plurality of radio resources required for the communication of the plurality of road users.

Embodiments further provide an apparatus for a road user. The apparatus comprises at least one interface for communicating with a further road user or with a stationary entity of a mobile communication system. The apparatus comprises a control module, configured to transmit environmental perception data of the road user to a further road user or to a stationary entity of the mobile communication system via the at least one interface. The control module is configured to receive a duplex resource scheme for a localized communication in the mobile communication system from the further road user or from the stationary entity via the at least one interface. The duplex resource scheme is based on the transmitted environmental perception data. The control module is configured to communicate via via the at least one interface based on the duplex resource scheme (e.g. by performing the localized communication based on the duplex resource scheme).

Embodiments further provide a further method, apparatus and computer program for a road user. The method comprises receiving a duplex resource scheme for a localized communication in a mobile communication system from a further road user or from a stationary entity. The duplex resource scheme is based on environmental perception data related to a plurality of road users. The method further comprises communicating in the mobile communication system based on the duplex resource scheme. The apparatus comprises at least one interface for communicating with a further road user or with a stationary entity of a mobile communication system. The apparatus comprises a control module, configured to receive a duplex resource scheme for a localized communication in a mobile communication system from the further road user or from the stationary entity via the at least one interface. The duplex resource scheme is based on environmental perception data related to a plurality of road users. The control module is configured to communicate in the mobile communication system via the at least one interface based on the duplex resource scheme (e.g. by performing the localized communication based on the duplex resource scheme).

Some other features or aspects will be described using the following non-limiting embodiments of apparatuses or methods or computer programs or computer program products by way of example only, and with reference to the accompanying figures, in which.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1A:
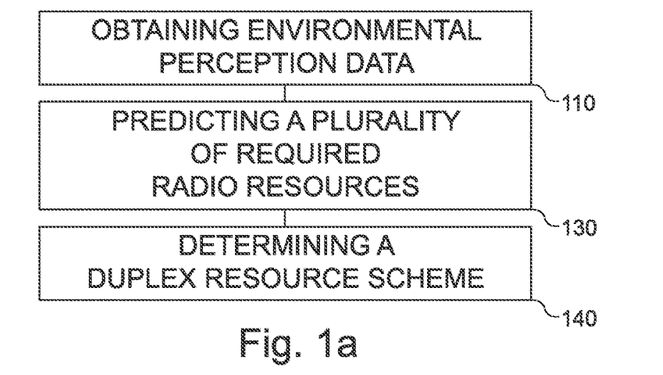
FIGS. 1a and 1b show flow charts of embodiments of a method for determining a duplex resource scheme for a localized communication in a mobile communication system.
Figure 1B:
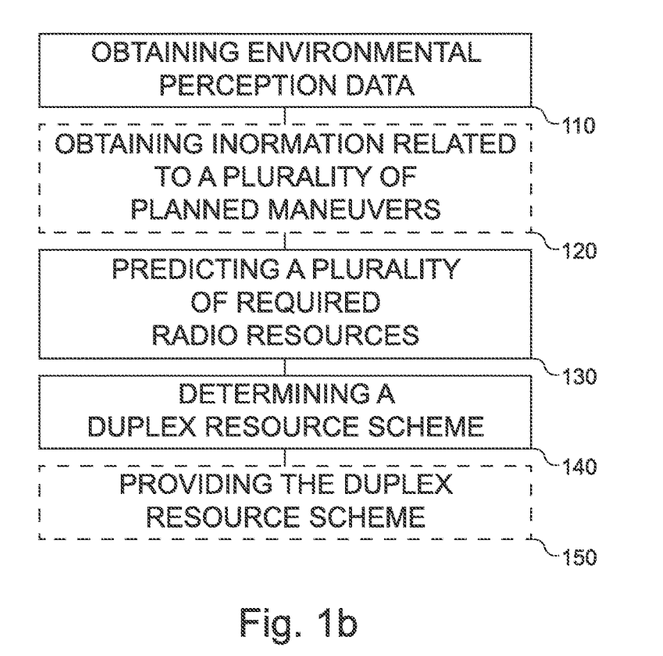

FIGS. 1a and 1b show flow charts of embodiments of a method (e.g. of a computer-implemented method) for determining a duplex resource scheme for a localized communication in a mobile communication system. The method comprises obtaining 110 environmental perception data. The environmental perception data relates to a plurality of road users 200. The method further comprises predicting 130 a plurality of radio resources required for a communication of the plurality of road users based on the obtained environmental perception data. The method further comprises determining 140 the duplex resource scheme based on the predicted plurality of radio resources required for the communication of the plurality of road users.

Figure 1C:
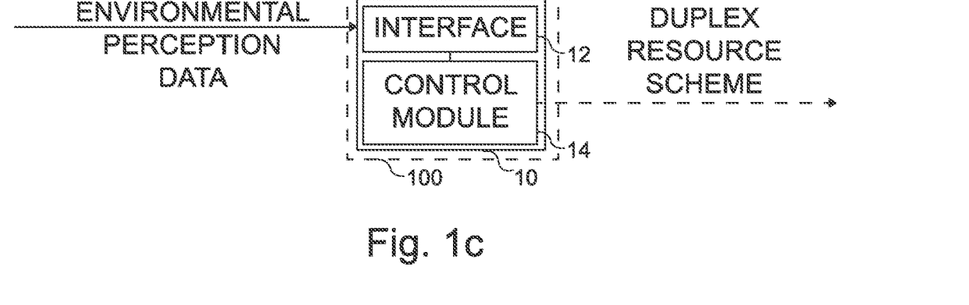
FIG. 1c shows a block diagram of an embodiment of an apparatus for determining a duplex resource scheme for a localized communication in a mobile communication system.

FIG. 1c shows a block diagram of an embodiment of a/an (corresponding) apparatus 10 for determining a duplex resource scheme for a localized communication in a mobile communication system. The apparatus comprises at least one interface 12 for communicating with a plurality of road users. The apparatus comprises a control module 14, which is coupled to the at least one interface 12. The control module may be configured to execute the method introduced in connection with FIG. 1a and/or 1b, e.g. in conjunction with the at least one interface 12. The control module 14 is configured to obtain environmental perception data, e.g. from a plurality of road users, via the at least one interface 12. The environmental perception data relates to the plurality of road users. The control module is configured to predict a plurality of radio resources required for a communication of the plurality of road users based on the obtained environmental perception data. The control module is configured to determine the duplex resource scheme based on the predicted plurality of radio resources required for the communication of the plurality of road users. FIG. 1c further shows a road user 100 or a stationary entity 100 of the mobile communication system 300 comprising the apparatus 10.

The following description relates to both the method of FIG. 1a and/or 1b and the apparatus of FIG. 1c.

In at least some embodiments the method is used to improve an allocation of radio resources within the mobile communication system. In mobile communication systems, there usually is a scheduling of radio resources. For example, in a frame of the mobile communication system, a first portion of the frame may be dedicated to uplink communication (from the mobile transceiver, e.g. a vehicle, to a base station of the mobile communication system), a second portion of the frame may be dedicated to downlink communication (from the base station to the mobile transceiver), and, particularly in vehicular communication, a third portion of the frame may be dedicated to side-link communication (from a mobile transceiver to another mobile transceiver, without the direct communication traversing the base station). Based on these portions, a scheduler may assign the uplink, downlink and sidelink resources to the communication nodes of the mobile communication system. In some systems, the first, second and third portions may be statically allocated within the frame. In embodiments, this allocation is variable, and is based on the duplex resource scheme. The duplex resource scheme may control the allocation of radio resources between the first, second and third portions within the frame. In other words, the duplex resource scheme may control the allocation of radio resources between uplink resources, downlink resources and sidelink resources within a pre-defined time interval (e.g. within a frame) for the localized communication in the mobile communication system.

This duplex resource scheme may be determined at different points in the mobile communication system. In some cases, the method may be executed by a stationary entity 320 of the mobile communication system 300. Accordingly, the duplex resource scheme may be determined by the stationary entity of the mobile communication system. The stationary entity of the mobile communication system may e.g. be base station of the mobile communication system, e.g. an evolved Node B (eNodeB) or a gNodeB of the mobile communication system or another stationary component of the mobile communication system that is located either in the core network or in the radio access network of the mobile communication system.

In other cases, the duplex resource scheme may be determined by a road user 100, e.g. a road user of the plurality of road users. In at least some embodiments, the plurality of road users may be connected road users (e.g. connected vehicles), i.e. autonomous road users (i.e. autonomous vehicles) or semi-autonomous road users (i.e. semi-autonomous vehicles) that are configured to communicate with other road users or with a backend server in order to make their driving decisions. In other words, the road user may be a connected vehicle, an autonomous vehicle or a semi-autonomous vehicle. For example, the plurality of road users or the further plurality of road users may be road users that are configured to coordinate their autonomous or semi-autonomous driving with other road users or with a backend server. In at least some embodiments, one of the plurality of vehicles may take on the task of providing the duplex resource scheme. For example, the road user may be a head vehicle of a vehicle cluster. In some embodiments, e.g. if the road user 100 is out of coverage of stationary base stations of the mobile communication system, the road user may take on the determining of the duplex resource scheme. In other words, the method may be executed by the road user, e.g. if the road user is out of coverage of the mobile communication system 300.

In general, the mobile communication system may, for example, correspond to one of the Third Generation Partnership Project (3GPP)-standardized mobile communication networks, where the term mobile communication system is used synonymously to mobile communication network. The mobile or wireless communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

In at least some embodiments, the mobile communication system may be a vehicular communication system e.g. a vehicle-to-network (V2N) communication system. For example, the mobile communication system may be or may be based on a C-V2X (Cellular-Vehicle-to-Anything, which may comprise Long Term Evolution Vehicle-to-Anything, LTE-V2X, and $5^{th}$ generation mobile communication system V2X, 5G-V2X) mobile communication system. The mobile communication system may support two communication modes: PC5, which is used between road users, and Uu, which is used between road users and base stations. Using PC5 and Uu, the mobile communication system may support direct vehicle-to-vehicle communication (without involvement of a base station as a communication hop, using PC5, either managed by the base station or autonomously), vehicle-to-vehicle communication via a base station of the mobile communication system, and vehicle-to-network communication via a base station of the mobile communication system. The direct vehicle-to-vehicle communication may be based on the same radio resources (e.g. the same frequency resources) as the communication via the base station of the road user. Consequently, there may be a joint planning of the radio resources for the direct vehicle-to-vehicle communication and for the communication via the base station.

Embodiments are focused on determining and using a duplex resource scheme. In embodiments, different radio resources may be duplexed, e.g. time resources, frequency resources, code resources and/or spatial resources. The duplex resources may be allotted between at least two of uplink communication, downlink communication, and side-link communication within the duplex resource scheme. In some cases, the duplex resource scheme may be or comprise a time duplex resource scheme. For example, the duplex resource scheme may comprise a dynamic time-division duplex (dynamic TDD) resource scheme. Within a dynamic TDD resource scheme, the time-slots within a frame may be dynamically (e.g. on a per-frame basis) allocated between uplink communication, downlink communication and (optionally) side-link communication. The duplex resource scheme may indicate or define a (dynamic) TDD frame structure.

In this context, side-link communication may be a direct communication between mobile terminals, e.g. vehicles, wherein the communication is performed directly between the mobile terminals, e.g. without the communication traversing a base station. In some cases, an allocation (e.g. scheduling) of the radio resources may be performed by a base station in side-link communication, but the communication itself might not involve the base station.

In various embodiments, the duplex resource scheme may comprise at least one of a frequency-division duplex resource scheme, a code duplex resource scheme, and a spatial resource scheme. In a frequency-division duplex resource scheme, the frequency resources may be dynamically (e.g. on a per-frame basis) allocated between uplink communication, downlink communication and (optionally) side-link communication. In a code duplex resource scheme, the code resources (i.e. codes of a plurality of concurrently valid codes) may be dynamically (e.g. on a per-frame basis) allocated between uplink communication, downlink communication and (optionally) side-link communication. In a spatial resource scheme, the spatial resources (e.g. using beam-forming for spatial separation) may be dynamically (e.g. on a per-frame basis) allocated between uplink communication, downlink communication and (optionally) side-link communication.

In embodiments, the duplex resource scheme is valid for the localized communication in the mobile communication system. The localized communication may be communication that occurs in a pre-defined area. For example, the localized communication may be vehicular communication, e.g. vehicle-to-vehicle or vehicle-to-network communication. In many cases, the pre-defined area may be covered by a base station of the mobile communication system. For example, the duplex resource scheme may be valid for a coverage area of a sector of a base station, for a coverage area of the entire base station, or for a coverage area of a plurality of interconnected base stations. Alternatively, the pre-defined area might be out of coverage of base stations of the mobile communication system (i.e. at least partially not within a coverage area of at least one of the base stations of the mobile communication system). In this case, the duplex resource scheme may be determined by a road user, and the localized communication may be among road users that obtain the duplex resource scheme from said road user. In this case, the pre-defined area may be a pre-defined area surrounding the road user or surrounding a cluster comprises the road user.

The method comprises obtaining 110 (i.e. receiving) environmental perception data, e.g. from the plurality of road users 200 or based on one or more perception sensors of a road user executing the method. For example, the environmental perception data may comprise modeling information for an area surrounding the plurality of road users (and/or surrounding the plurality of road-side infrastructure entities). The environmental perception data may comprise information related to static objects, e.g. buildings, road signs, etc. and dynamic objects, e.g. pedestrians, cyclists, etc., around the road user/road users. This information may be generated by an environmental model perceived by the road user/road users and by infrastructure. Embodiments further provide an interface between an application layer of a road user and a media access control layer of a road user. If the environmental perception data is generated by the road user executing the method, the method may comprise determining the environmental perception data at an application layer of the road user, and providing the environmental perception data to the media access control layer of the road user, e.g. so the media access control layer determines the duplex resource scheme. If the environmental perception data is provided by the plurality of road users, the processing of the environmental perception data may be performed in the media access control layer, e.g. by packet inspection of packets received from the plurality of vehicles. The modeling information may relate to objects that have been identified by the road user or by the plurality of road users using the one or more perception sensors of the plurality of the road user or of the road users (similar for road-side infrastructure entities). For example, the one or more perception sensors of the road users/road user/infrastructure entities may comprise at least one of a RADAR (Radio Detection and Ranging, in the following denoted "radar") sensor, a LIDAR (Light Detection and Ranging, in the following denoted "lidar") sensor, a camera sensor and an ultrasound sensor. The environmental perception data might not comprise the respective sensor data, but might correspond to a high-level abstraction of the sensor data of the one or more perception sensors of the road user or of the plurality of road users (and/or of the plurality of road-side infrastructure entities). For example, an environmental perception model of the environmental perception data may comprise information related to a position and/or of an extent of the objects that have been identified by the road user or the plurality of road users (and/or by the plurality of road-side infrastructure entities) using one or more perception sensors of the road user or the plurality of road users (and/or of the plurality of road-side infrastructure entities). In some embodiments, an environmental perception model of the environmental perception data may comprise information related to an identifier of the objects that have been identified by the road user or by the plurality of road users (and/or by the plurality of road-side infrastructure entities) using one or more perception sensors of the road user or the plurality of road users (and/or of the plurality of road-side infrastructure entities), e.g. if the objects are connected road users (i.e. if the objects are road users that communicate with the plurality of road users).

In some embodiments, at least part of the environmental perception data may be obtained from one or more road-side infrastructure entities. In other words, the environmental perception data may be obtained 110 from the plurality of road users and from the one or more road-side infrastructure entities. The environmental perception data may originate from the plurality of road users and from the one or more road-side infrastructure entities. For example, the one or more road-side infrastructure entities may comprise at least one of a traffic light, a traffic velocity meter, a traffic control station and a toll bridge.

In at least some embodiments, the plurality of road users or the may be connected road users (e.g. connected vehicles), i.e. autonomous road users (i.e. autonomous vehicles) or semi-autonomous road users (i.e. semi-autonomous vehicles) that are configured to communicate with other road users or with a backend server in order to make their driving decisions. For example, the plurality of road users or the further plurality of road users may be road users that are configured to coordinate their autonomous or semi-autonomous driving with other road users or with a backend server.

In addition, as shown in FIG. 1b, the method may comprise obtaining 120 information related to a plurality of planned maneuvers of the plurality of road users. The information related to the plurality of planned maneuvers may be transmitted by the plurality of road users. The information related to the plurality of planned maneuvers of the plurality of road users may indicate, which driving maneuvers (i.e. lane changes, turns, overtaking maneuvers etc.) the plurality of road users are planning to undertake (i.e. within the next at most 30 seconds). Accordingly, a planned driving maneuver of the plurality of planned driving maneuver may be an (imminent) driving maneuver that a road user of the plurality of road users is planning to execute within at most 30 s (or within at most 25 s, at most 20 s, at most 15 s, at most 10 s) (e.g. after obtaining the information related to the driving maneuver). If the method is executed by the road user, the method may comprise determining information related to a planned maneuver of the road user.

In at least some embodiments, the method further comprises obtaining information related to a plurality of planned routes of the plurality of road users. In contrast with the plurality of planned maneuvers, the plurality of planned routes may comprise information related to a plurality of planned destinations of the plurality of road users, i.e. long-term routes of the plurality of road users. For example, the plurality of planned routes may indicate a plurality of roads the plurality of road users are intending to travel along the plurality of routes. For example, the information related to the plurality of planned routes of the plurality of road users may indicate which lanes or road exits the plurality of road users are planning to use. If the method is executed by the road user, the method may comprise determining information related to a planned route of the road user.

The method comprises predicting 130 a plurality of radio resources required for a communication of the plurality of road users based on the obtained environmental perception data. For example, the plurality of radio resources required for the communication of the plurality of road users may be determined based on a plurality of traffic situations that are deduced from the environmental perception data. The prediction 130 of the plurality of radio resources required for the communication of the plurality of road users may comprise predicting a position and a movement of the plurality of road users (and of further road users located in the vicinity of the plurality of road users) based on the environmental perception data. The prediction of the position and movement of the further plurality of road users (or of the plurality of road users) may be used to determine traffic situations, which may in turn be used to predict the plurality of radio resources required for the communication of the plurality of road users. In other words, the obtained environmental perception data may be indicative of traffic situations, in which the plurality of road users are involved. The traffic situations may correspond to traffic situations that involve more than one road user, i.e. traffic situations that require communication between connected road users (i.e. connected vehicles). For example, a traffic situation may be a situation that involves two or more road users, wherein the situation requires or benefits from a cooperation of the two or more road users. In these traffic situations, the plurality of road users may be predicted to communicate according to a previously known pattern. The previously known pattern may be based on previous communication in previous traffic situations, and may be used to predict the radio resources required for the communication of the plurality of road users. For example, if the obtained environmental perception data indicates, that a road users desires to merge into a lane, a previously known communication pattern, that is derived from previous, similar situations, may be used to predict the plurality of radio resources required for the communication of the plurality of road users. In at least some embodiments, the environmental perception data may comprise a plurality of environmental perception models of the plurality of road users. Alternatively or additionally, the environmental perception data may comprise a combined environmental perception model for the pre-defined area based on the plurality of environmental perception models, wherein the plurality of environmental perception models are fused within the combined environmental perception model.

In some embodiments, the plurality of radio resources required for the communication of the plurality of road users are predicted based on the information related to the plurality of planned maneuvers of the plurality of road users (or based on the information related to the planed maneuver of the road user). Alternatively or additionally, the plurality of radio resources required for the communication of the plurality of road users may be predicted based on the information related to the plurality of planned routes of the plurality of road users (or based on the information related to the planed route of the road user). For example, the method may comprise determining the traffic situations based on the information related to the plurality of planned maneuvers of the plurality of road users and/or based on the information related to the plurality of planned routes of the plurality of road users. For example, if a planned maneuver or planned route is used for the prediction of the traffic situations, the positions of the plurality of road users in the environmental perception data may be augmented with the driving intentions of the plurality of road users, which may enable a more precise determination of the traffic situations, and thus the plurality of radio resources required for the communication of the plurality of road users are predicted based on the information related to the plurality of planned maneuvers of the plurality of road users.

The method further comprises determining 140 the duplex resource scheme based on the predicted plurality of radio resources required for the communication of the plurality of road users. For example, the determining 140 of the duplex resource scheme may comprise determining, which of the duplex resources are to be used for uplink communication, downlink communication and (optionally) side-link communication. For example, the determining 140 of the duplex resource scheme may determine the duplex resource scheme such that the predicted plurality of radio resources required for the communication of the plurality of road users are satisfied by the duplex resource scheme. For example, the radio resources required for the communication of the plurality of road users may indicate an amount of radio resources required for uplink communication, an amount of radio resources required for downlink communication, and (optionally) an amount of radio resources required for downlink communication. The duplex resource scheme may be determined 140 such that the amount of radio resources required for uplink communication, the amount of radio resources required for downlink communication, and (optionally) the amount of radio resources required for downlink communication are sufficiently present within the duplex resource scheme. In some embodiments, e.g. if the method is executed by a road user, the method may further comprise coordinating or negotiating the duplex resource scheme with one or more further road users, e.g. via sidelink communication.

In at least some embodiments, as further shown in FIG. 1b, the method comprises providing 150 (e.g. transmitting) the duplex resource scheme to the plurality of road users 200 using a control channel of the mobile communication system 300. For example, the control channel may be physical control channel of the mobile communication system, e.g. a physical downlink control channel (PDCCH), a physical uplink control channel (PUCCH) or a physical sidelink control channel (PSCCH) of the mobile communication system. The duplex resource scheme may be provided at a position within a slot of the control channel that is dedicated to providing the duplex resource scheme.

The at least one interface 12 may correspond to one or more inputs and/or outputs for receiving and/or transmitting information, which may be in digital (bit) values according to a specified code, within a module, between modules or between modules of different entities. The at least one interface may be configured to communicate in the mobile communication system.

In embodiments the control module 14 may be implemented using one or more processing units, one or more processing devices, any means for processing, such as a processor, a computer or a programmable hardware component being operable with accordingly adapted software. In other words, the described function of the control module 14 may as well be implemented in software, which is then executed on one or more programmable hardware components. Such hardware components may comprise a general purpose processor, a Digital Signal Processor (DSP), a micro-controller, etc.

More details and aspects of the method and/or apparatus 10 are mentioned in connection with the proposed concept or one or more examples described above or below (e.g. FIGS. 2a to 4). The method and/or apparatus 10 may comprise one or more additional optional features corresponding to one or more aspects of the proposed concept or one or more examples described above or below.

Figure 2A:
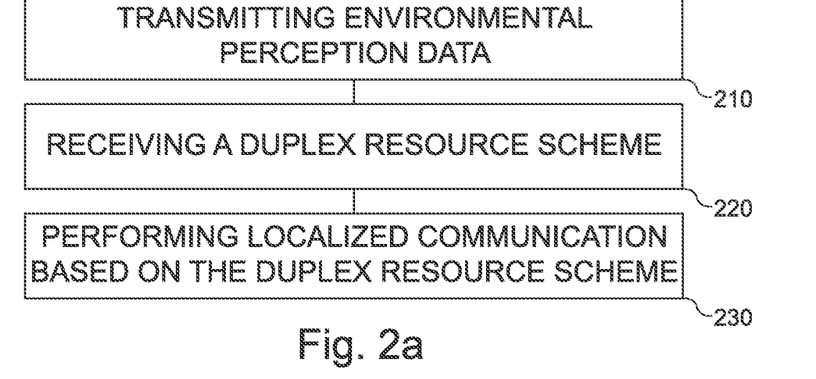
FIG. 2a shows a flow chart of an embodiment of a method for a road user, such as a vehicle.

FIG. 2a shows a flow chart of an embodiment of a method (e.g. of a computer-implemented method) for a road user 200, such as a vehicle. The method may be executed by the road user 200. The method comprises transmitting 210 environmental perception data of the road user to a further road user or to a stationary entity of a mobile communication system. The method further comprises receiving 220 a duplex resource scheme for a localized communication in the mobile communication system from the further road user or from the stationary entity. The duplex resource scheme is based on the transmitted environmental perception data. The method further comprises performing the localized communication based on the duplex resource scheme.

Figure 2B:
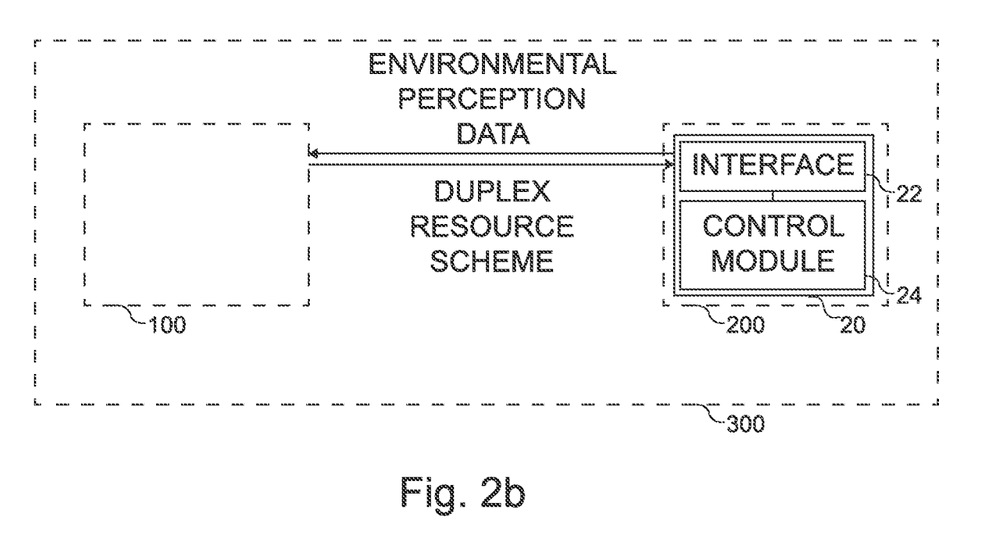
FIG. 2b shows a block diagram of an embodiment of an apparatus for a road user, such as a vehicle.

FIG. 2b shows a block diagram of an embodiment of a/an (corresponding) apparatus for a road user, e.g. an apparatus 20 for a vehicle 200. The apparatus 20 comprises at least one interface 22 for communicating with a further road user or with a stationary entity of a mobile communication system 300. The apparatus 20 comprises a control module 24, which is coupled to the at least one interface 22. The control module 24 is configured to execute the method introduced in connection with FIG. 2a, e.g. in conjunction with the at least one interface 22. For example, the control module is configured to transmit environmental perception data of the road user 200 to a further road user 100 or to a stationary entity 100 of the mobile communication system 300 via the at least one interface 22. The control module is configured to receive a duplex resource scheme for a localized communication in the mobile communication system 300 from the further road user or from the stationary entity via the at least one interface 22. The duplex resource scheme is based on the transmitted environmental perception data. The control module is configured to communicate via the at least one interface 22 (e.g. using localized communication) based on the duplex resource scheme. FIG. 2b further shows the road user 200 (e.g. a vehicle 200) comprising the apparatus 20. The road user 200 may further comprise the apparatus 10. FIG. 2b further shows a system comprising a further road user 100 or a stationary entity 100 (e.g. comprising the apparatus 10) and a road user 200 comprising the apparatus 20.

The following description relates to both the method of FIG. 2a and the apparatus of FIG. 2b. Although the description is described in connection with a road user, the method and apparatus may also be used in connection with a road-side infrastructure entity. Correspondingly, the method and/or the apparatus may be suitable for a road-side infrastructure entity. Embodiments provide the road-side infrastructure entity comprising the apparatus and/or executing the method.

The method comprises transmitting 210 environmental perception data of the road user to a further road user or to a stationary entity of a mobile communication system.

For example, the environmental perception data may comprise modeling information for an area surrounding the road userroad user/the road side infrastructure entity. The method may comprise determining the environmental perception data, e.g. based on perception sensor data of the road user/road-side infrastructure entity. The environmental perception data may be determined on an application layer of a control module of the road user/road-side infrastructure entity, e.g. by packet inspection and/or by content analysis of sensor data. The environmental perception data may comprise information related to the static, e.g. buildings, road signs, etc. and dynamic objects, e.g. pedestrians, cyclists, etc., around the road user/vehicle. The modeling information may relate to objects that have been identified by the road user using one or more perception sensors of the road user (similar for road-side infrastructure entities). For example, the one or more perception sensors of the road user (or road-side infrastructure entities) may comprise at least one of a RADAR (Radio Detection and Ranging, in the following denoted "radar") sensor, a LIDAR (Light Detection and Ranging, in the following denoted "lidar") sensor, a camera sensor and an ultrasound sensor. The environmental perception data might not comprise the respective sensor data, but might correspond to a high-level abstraction of the sensor data of the one or more perception sensors of the road user (or of the road-side infrastructure entity). For example, the environmental perception data may comprise information related to a position and/or of an extent of the objects that have been identified by the road user (or by the road-side infrastructure entity) using one or more perception sensors of the plurality of road user (or of the road-side infrastructure entity). In some embodiments, the environmental perception data may comprise information related to an identifier of the objects that have been identified by the road user (or by the road-side infrastructure entity) using the one or more perception sensors of the road user (or by the road-side infrastructure entity), e.g. if the objects are connected road users (i.e. if the objects are road users that communicate with the road user).

In some embodiments, the method may comprise transmitting information related to a planned maneuver of the road user to the further road user or to the stationary entity of a mobile communication system. The method may comprise determining the information related to the planned maneuver, e.g. based on an autonomous or semi-autonomous driving algorithm of the road user.

In some embodiments, the method may comprise transmitting information related to a planned route of the road user to the further road user or to the stationary entity of a mobile communication system. The method may comprise determining the information related to the planned route, e.g. based on a planned destination that is input into a satellite navigation unit of the road user or based on a destination of an autonomous or semi-autonomous driving algorithm of the road user.

The method further comprises receiving 220 a duplex resource scheme for a localized communication in the mobile communication system from the further road user or from the stationary entity, e.g. via a control channel of the mobile communication system. The duplex resource scheme is based on the transmitted environmental perception data.

The method further comprises performing 230 the localized communication (e.g. by communicating in the mobile communication system) based on the duplex resource scheme. For example, the method may comprise processing scheduling information received via the mobile communication system based on (e.g. in light of) the duplex resource scheme. For example, the method may comprise choosing radio resources of the mobile communication system for communicating in the mobile communication system (e.g. for the localized communication) based on the duplex resource scheme.

The at least one interface 22 may correspond to one or more inputs and/or outputs for receiving and/or transmitting information, which may be in digital (bit) values according to a specified code, within a module, between modules or between modules of different entities. The at least one interface may be configured to communicate in the mobile communication system.

In embodiments the control module 24 may be implemented using one or more processing units, one or more processing devices, any means for processing, such as a processor, a computer or a programmable hardware component being operable with accordingly adapted software. In other words, the described function of the control module 24 may as well be implemented in software, which is then executed on one or more programmable hardware components. Such hardware components may comprise a general purpose processor, a Digital Signal Processor (DSP), a micro-controller, etc.

At least some embodiments focus on providing an improved PHY (physical layer) access scheme for V2V/PC5. Embodiments may be based on using adaptive/dynamic TDD based on Cooperative Perception Messages (CPM, e.g. the environmental perception data) and/or Maneuver Coordination Message (MCM, e.g. the information related to the planned maneuver). Embodiments may use a centralized or a decentralized approach, depending on coverage.

In other words, embodiments may be based on exchanging sensor data/messages between an application layer (of the road users) and a scheduler (either at the UE (User Equipment, e.g. the road user) or gNB (g Node B), and based on adapting a TDD frame structure based on the sensor data/messages.

To gather the environmental perception data, the environmental perception data may be generated by a road user executing the method, or may be received from the plurality of road users. If the environmental perception data is received from the plurality of road users (or even transmitted by the road user executing the method), packet inspection at a lower level, e.g. the media access control level, may be used to extract the environmental perception data. If the environmental perception data is generated by the road user executing the method, a communication interface may be provided between the application layer (APP) providing the environmental perception data and the media access control layer (MAC) determining the duplex resource scheme.

Embodiments may be used to support critical maneuvers. If, for example, a critical maneuver requires more downlink (or sidelink) slots, the duplex resource scheme may be adapted accordingly, e.g. by the coordinator, to enable Repetition (URLLC, ultra reliable low latency communication).

Figure 3:
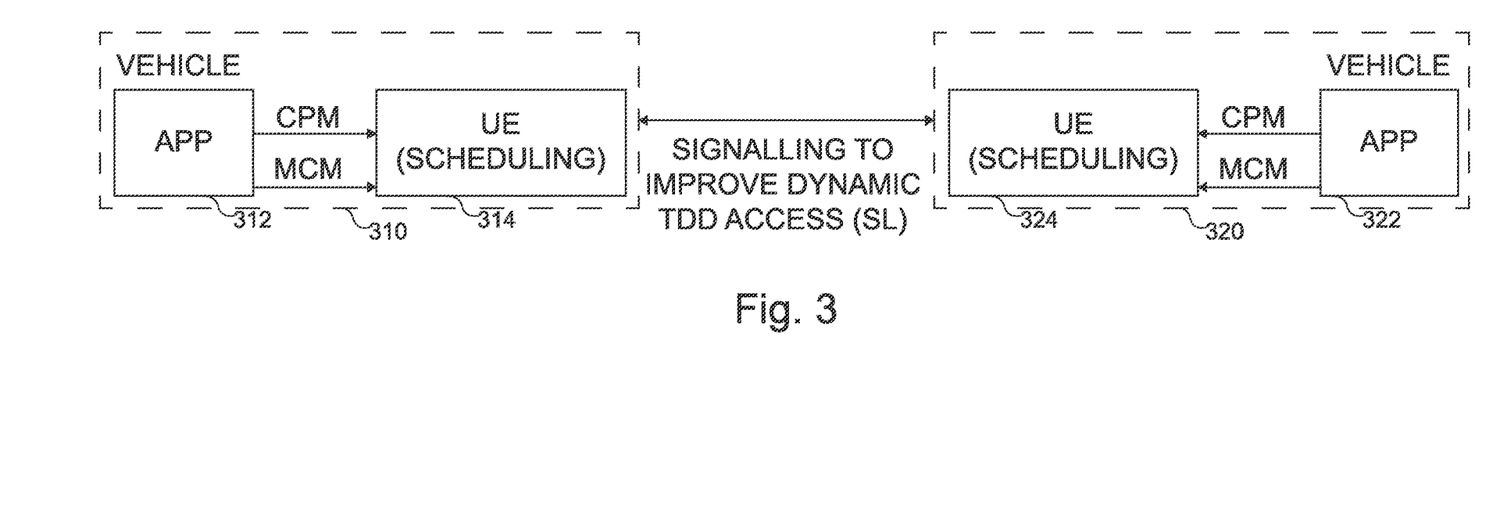
FIG. 3 shows a block diagram of an embodiment of a determination of a duplex resource scheme for a localized communication in a mobile communication system, wherein the determination is performed by a road user.
Figure 4:
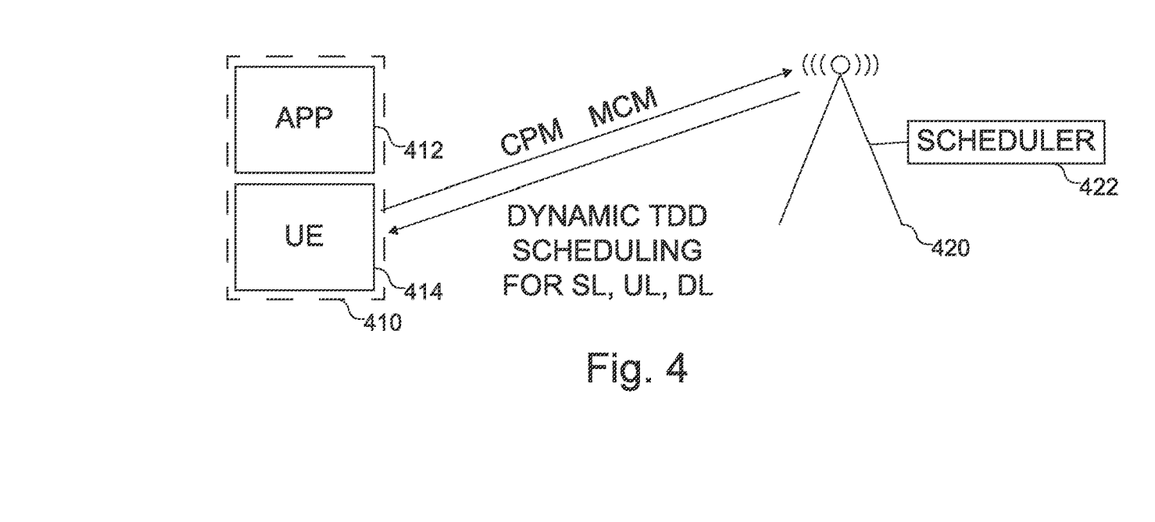
FIG. 4 shows a block diagram of an embodiment of a determination of a duplex resource scheme for a localized communication in a mobile communication system, wherein the determination is performed by a stationary entity of the mobile communication system.

In the following, two embodiments are presented. In FIG. 3, the determination of the duplex resource scheme is performed by a user (or two users, in coordination). In FIG. 4, the duplex resource scheme is determined by a stationary entity of the mobile communication system.

FIG. 3 shows a block diagram of an embodiment of a determination of a duplex resource scheme for a localized communication in a mobile communication system, wherein the determination is performed by a road user. FIG. 3 shows two road users (vehicles) 310 and 320, which both comprise an application layer (APP) 312; 322 and a UE 314; 324 (user equipment, an entity of the vehicle responsible for communicating with the respective other vehicle and for determining the duplex resource scheme). In this scenario, the UE may be responsible for scheduling and for determining the duplex resource scheme. To determine the scheduling and the duplex resource scheme, the UEs may receive Cooperative Perception Messages (CPM, e.g. the environmental perception data) and/or Maneuver Coordination Message (MCM, e.g. the information related to the planned maneuver) from the APP, and the scheduling and/or the duplex resource scheme may be based on the CPM and/or MCM messages. Additionally, there may be signaling to improve the dynamic TDD access (via the sidelink between the vehicles).

FIG. 4 shows a block diagram of an embodiment of a determination of a duplex resource scheme for a localized communication in a mobile communication system, wherein the determination is performed by a stationary entity of the mobile communication system. FIG. 4 shows a road user 410, comprising an APP 412 and a UE 414 (similar to the APP/UE shown in FIG. 3). Contrary to FIG. 3, a base station 420, e.g. a scheduler 422 of the base station 420, may be responsible for determining the duplex resource scheme. In this case, the road user 410 may provide the CPM/MCM messages to the base station 420, and receive the duplex resource scheme, e.g. the dynamic TDD scheduling, for the sidelink communication (SL), the uplink communication (UL) and the downlink communication (DL), from the base station 420.

More details and aspects of embodiments are mentioned in connection with the proposed concept or one or more examples described above (e.g. FIG. 1a to 2b). Embodiments may comprise one or more additional optional features corresponding to one or more aspects of the proposed concept or one or more examples described above or below.

As already mentioned, in embodiments the respective methods may be implemented as computer programs or codes, which can be executed on a respective hardware. Hence, another embodiment is a computer program having a program code for performing at least one of the above methods, when the computer program is executed on a computer, a processor, or a programmable hardware component. A further embodiment is a computer readable storage medium storing instructions which, when executed by a computer, processor, or programmable hardware component, cause the computer to implement one of the methods described herein.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

LIST OF REFERENCE SIGNS

10 Apparatus
12 Interface
14 Control module
20 Apparatus
22 Interface
24 Control module
100 Road user or stationary entity of the mobile communication system
110 Obtaining environmental perception data
120 Obtaining information related to a plurality of planned maneuvers
130 Predicting a plurality of radio resources required for a communication of a plurality of road users
140 Determining a duplex resource scheme
150 Providing the duplex resource scheme
200 Road user
210 Transmitting environmental perception data
220 Receiving a duplex resource scheme
230 Performing a localized communication
300 Mobile communication system
310, 320, 410 Road user, vehicle
312, 322, 412 APP
314, 324, 414 UE
420 Stationary entity, base station
422 Scheduler

The invention claimed is:

1. A method for determining a duplex resource scheme for a localized communication in a mobile communication system, the method comprising:
Obtaining environmental perception data, wherein the environmental perception data relates to a plurality of road users and includes modeling information for an area surrounding the plurality of road users, wherein the modeling information relates to objects that have been identified by a road user executing the method or by the plurality of road users using one or more perception sensors of the road user or of the plurality of road users;
Predicting a plurality of radio resources required for a communication of the plurality of road users based on the obtained environmental perception data; and
Determining the duplex resource scheme based on the predicted plurality of radio resources required for the communication of the plurality of road users.

2. The method according to claim 1, wherein the duplex resource scheme comprises a dynamic time-division duplex resource scheme.

3. The method according to claim 1, wherein the duplex resource scheme comprises at least one of a frequency-division duplex resource scheme, a code duplex resource scheme, and a spatial resource scheme.

4. The method according to claim 1, wherein the duplex resources are allotted between at least two of uplink communication, downlink communication, and side-link communication within the duplex resource scheme.

5. The method according to claim 1, wherein the method comprises obtaining information related to a plurality of planned maneuvers of the plurality of road users, wherein the plurality of radio resources required for the communication of the plurality of road users are predicted based on the information related to the plurality of planned maneuvers of the plurality of road users.

6. The method according to claim 1, wherein the method is executed by a stationary entity of the mobile communication system.

7. The method according to claim 1, wherein the method is executed by a road user.

8. The method according to claim 7, wherein the method is executed by the road user if the road user is out of coverage of the mobile communication system,
and/or wherein the environmental perception data is based on one or more perception sensors of the road user.

9. The method according to claim 1, wherein the environmental perception data is obtained from the plurality of road users and from one or more road-side infrastructure entities.

10. The method according to claim 1, wherein the method comprises providing the duplex resource scheme to the plurality of road users using a control channel of the mobile communication system.

11. A non-transitory computer-readable storage medium comprising a program code for performing a method of claim 1.

12. A method for a road user, the method comprising:
Transmitting environmental perception data of the road user to a further road user or to a stationary entity of a mobile communication system, wherein the environmental perception data includes modeling information for an area surrounding the road user, wherein the modeling information relates to objects that have been identified by the road user;
Receiving a duplex resource scheme for a localized communication in the mobile communication system from the further road user or from the stationary entity, wherein the duplex resource scheme is based on the transmitted environmental perception data; and
Performing the localized communication based on the duplex resource scheme.

13. A non-transitory computer-readable storage medium comprising a program code for performing a method of claim 12.

14. An apparatus for determining a duplex resource scheme for a localized communication in a mobile communication system, the apparatus comprising:
at least one interface for communicating with a plurality of road users; and
a control module configured to:
Obtain environmental perception data via the at least one interface, wherein the environmental perception data relates to a plurality of road users and includes modeling information for an area surrounding the plurality of road users, wherein the modeling information relates to objects that have been identified by a road user executing the method or by the plurality of road users using one or more perception sensors of the road user or of the plurality of road users,
Predict a plurality of radio resources required for a communication of the plurality of road users based on the obtained environmental perception data, and
Determine the duplex resource scheme based on the predicted plurality of radio resources required for the communication of the plurality of road users.

15. An apparatus for a road user, the apparatus comprising:
- at least one interface for communicating with a further road user or with a stationary entity of a mobile communication system; and
- a control module, configured to:
  - Transmit environmental perception data of the road user to a further road user or to a stationary entity of the mobile communication system via the at least one interface, wherein the environmental perception data includes modeling information for an area surrounding the road user, wherein the modeling information relates to objects that have been identified by the road user;
  - Receive a duplex resource scheme for a localized communication in the mobile communication system from the further road user or from the stationary entity via the at least one interface, wherein the duplex resource scheme is based on the transmitted environmental perception data, and
  - Communicate via the at least one interface based on the duplex resource scheme.

\* \* \* \* \*

UNITED STATES PATENT AND TRADEMARK OFFICE
CERTIFICATE OF CORRECTION

PATENT NO. : 11,343,059 B2
APPLICATION NO. : 16/810967
DATED : May 24, 2022
INVENTOR(S) : Ahmad El Assaad, Ernst Zielinski and Joakim Cervall It is certified that error appears in the above-identified patent and that said Letters Patent is hereby corrected as shown below:

On the Title Page (Item (72)), the name of the inventor "Joakim Cerwall" should read --Joakim Cervall--.

Signed and Sealed this
Twenty-seventh Day of September, 2022

Katherine Kelly Vidal
Director of the United States Patent and Trademark Office